United States Patent
Symmes

[11] 3,782,006
[45] Jan. 1, 1974

[54] MEANS AND METHODS TO ASSIST PEOPLE IN BUILDING UP AN AVERSION TO UNDESIRABLE HABITS

[75] Inventor: Eliot N. Symmes, San Francisco, Calif.

[73] Assignee: American Clinic, Inc., San Jose, Calif.

[22] Filed: May 26, 1972

[21] Appl. No.: 254,786

[52] U.S. Cl.................................................. 35/22 R
[51] Int. Cl. ........................................... G09b 19/00
[58] Field of Search......................... 35/22 R, 21, 1; 128/1 C, 419 S; 272/10, 18, 8 R, 27 R; 273/1 E

[56] References Cited
UNITED STATES PATENTS
3,014,477  12/1961  Carlin .................................. 128/1 C
3,205,316  9/1965  Hechler.......................... 128/1 C UX
1,550,497  8/1925  Bray et al........................... 272/27 R FOREIGN PATENTS OR APPLICATIONS
1,557,773  1/1969  France................................ 35/22 R Primary Examiner—Wm. H. Grieb
Attorney—Edward M. Farrell

[57] ABSTRACT

Methods and means for assisting persons in breaking undesirable habits include means for projecting first and second images onto a screen. The first image is a fixation image to induce a person to concentrate in a small limited area. The second image relates to an object or message relating to the habits to be broken. Various additional sensory messages, such as electrical or audio signals, are communicated to the person while one or both of the images are being projected on the screen.

10 Claims, 2 Drawing Figures

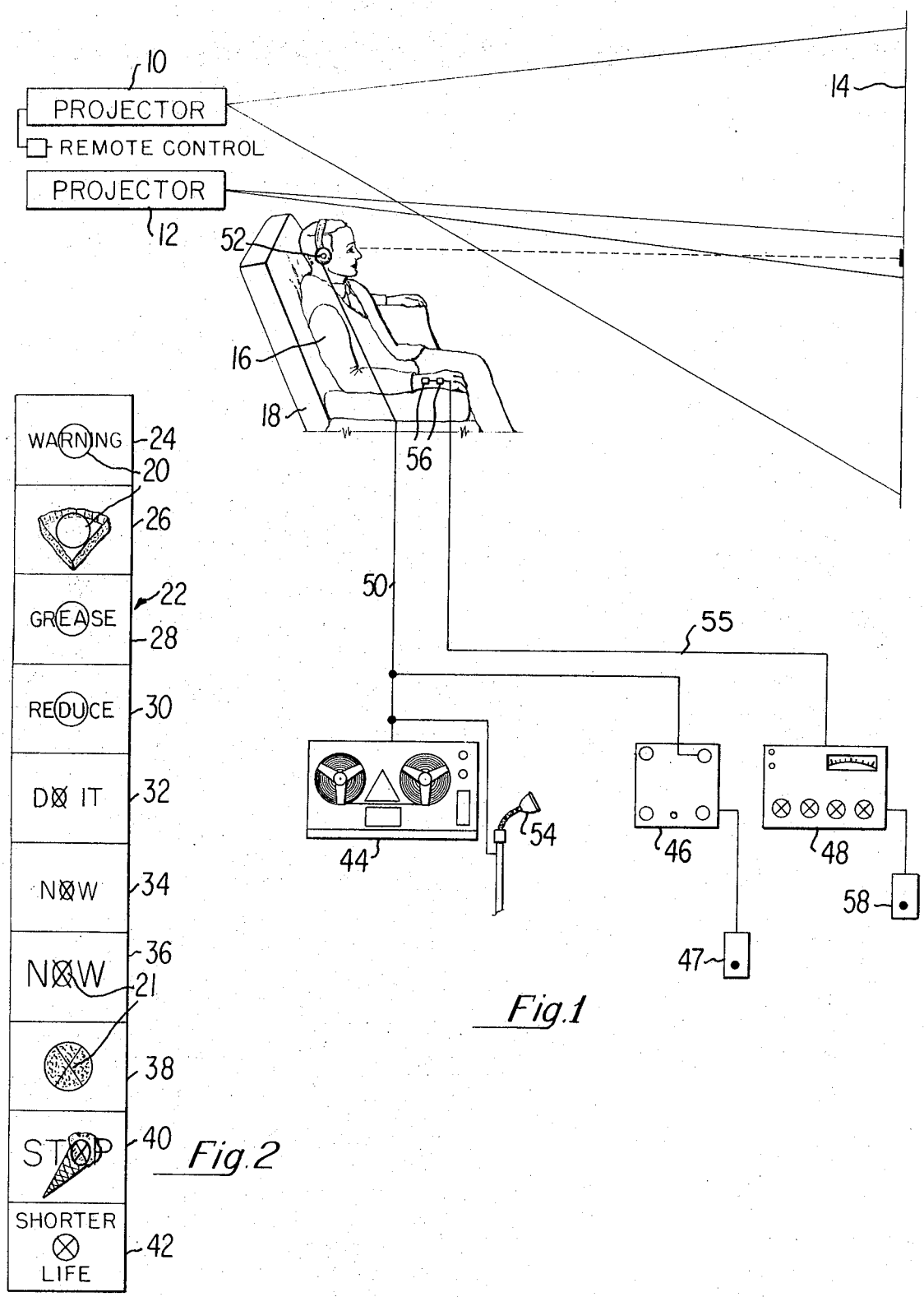

MEANS AND METHODS TO ASSIST PEOPLE IN BUILDING UP AN AVERSION TO UNDESIRABLE HABITS

It is well known that a person may develop undesirable habits which may adversely affect his health, state of mind or general well being. These habits generally originate from environmental conditions experienced during youth, the person's family life, his working conditions or from the many tensions resulting from pressures in a modern day society to which the person is exposed.

After an undesirable habit has been developed, it is very difficult for the average person to break it. This is especially true in cases where the habit has persisted over a number of years. Realization by the person involved that the habit may be detrimental to his health and general well being is often not sufficient to enable a person to break the habit.

Some of the habits developed by many people in our society involve smoking, over-eating, consumption of drugs and other habits which tend to cause physical and mental problems, which, in addition to causing general unhappiness, often lead to shorter life spans.

It is known that psychology and hypnotism, among other techniques, have been employed to assist persons to build up adversions to undesirable habits. In order to adequately treat different types of persons for different habits, different approaches must be employed by the psychologist, hypnotist or other trained personnel performing the treatments. It is often necessary to implement the words or suggestions of the individual administering the treatments with additional manifestations or suggestions from other sources.

It is known that, if a person starts to associate his habit with some unpleasant occurrence or experience, he will often associate the habit with the unpleasantness and build up an aversion to the habit.

While the words of the individual performing the treatment often carry a certain amount of persuasion to assist the person being treated to build up an aversion to a habit, it is desirable to supplement the words of the psychologist or hypnotist with additional manifestations. To achieve maximum results it is desirable to associate a maximum amount of unpleasantness with the habit to be broken in order to develope an aversion to the habit in a minimum amount of treatment time.

It is recognized that human beings experience and gain knowledge through all their senses, i.e., by seeing, hearing and feeling, for example. Ideally, if more than one or all of a person's senses could be used to receive messages which would associate unpleasantness towards a particular habit, the time taken to build up an aversion to that habit would be minimized.

It is an object of this invention to provide novel methods and means for treating a person to assist him in averting certain habits.

It is a further object of this invention to provide novel methods and means to assist persons to change undesirable habits, where the habits may involve a wide variety of different forms.

It is still a further object of this invention to provide novel methods and apparatus for treating persons to assist them in overcoming bad habits, in which the types of treatment available are widely variable to accommodate a wide variety of different people with different habits to be cured.

In accordance with the present invention, apparatus for assisting a person to build up an aversion to an undesirable habit includes visual displays for focusing his attention on a small area of a screen and then displaying a picture of an object or message relating to the habit on the screen. Additional means selectively provide audio signals, electrical shock signals, and/or other sensory messages to accompany the visual displays.

Other objects and advantages of the present invention will be apparent to those skilled in the art, from a reading of the following specification and claims, in conjunction with the accompanying drawing, in which:

FIG. 1 is a view, partly in block diagram form, illustrating a system for assisting a person to build up aversions to bad habits, in accordance with the present invention, and FIG. 2 illustrates a slide for a projector which may be employed in the present invention.

Referring to the drawing, FIG. 1 illustrates an overall arrangement for treating a person and assisting him in building up an aversion to an undesirable habit. A pair of projectors 10 and 12 is disposed to project images onto a screen 14. FIG. 2 illustrates a series of images which may be projected onto a screen 14 by the projectors 10 and 12.

In treating a person 16 seated in a seat 18, a psychologist or other trained individual may go through a preliminary routine to put the person at ease. The individual giving the treatment then attempts to get the person to focus his attention on a relatively small area on the screen 14. While concentrating on the small area, the person tends to free his mind of extraneous thoughts. The projector 12 is used to project a relatively small image, illustrated in the form of small circles 20 or "X"s 21 on a slide 22.

When the person is concentrating his attention on a relatively small circle 20 or "X" 21 projected onto the screen 14, the person being treated may be subjected to other induced sensory manifestations, as will be described.

When the person is concentrating his attention on the relatively small projected image on the screen, the projector 10 projects a second image onto the screen 14. The second image is associated with the habit for which the person is being treated. The second image may involve a number of different images sequentially presented as by a slide projector.

In FIG. 2 the slide 22 includes a number of different objects or messages. The particular slide 22 illustrated is used in connection with the habit of overeating. The various images are sequentially projected to induce a person to properly diet by building up an aversion to eating certain types of foods, notably calory rich desserts. Similar type slides to the slide 22 may be used in connection with building up aversions to smoking, drugs or other undesirable habits. In these cases, different images and messages would of course be included on the slides.

In FIG. 2, the circles 20 and "X"s 21 are illustrated to indicate how they are continuously projected along with the second image as the slide 22 is moved from frame to frame. In actual practice, the circles 20 and "X"s 21 would not actually be on the slide but rather super-imposed on the images or messages projected on the screen 14. The first images from the projector 12 are shown on the slide 22 merely for purposes of explanation.

The first frame 24 on the slide 22 includes the word "WARNING." This word or message alerts the person 16 and generally connotes something unpleasant. The next frame 26 illustrates a piece of pie, probably a food which the person enjoys eating. The next frame 28 illustrates the word "GREASE." Immediately following the picture of the pie, the person being treated relates the word "GREASE" to the pie. Thus, an unpleasant connotation is associated with pie.

The next frame 30 includes the word "REDUCE." All the time that the slide is being moved from frame to frame, the person being treated has his attention focused on the circle 20, which is super-imposed on a message or illustration.

After the word "REDUCE," the frames 32 and 34 are sequentially projected to display the words "DO IT" and "NOW," respectively. The image "X" is used in this frame and the subsequent frames. Following the frame 34, the frame 36 includes the word "NOW" again, this time in larger letters than those displayed by the frame 34. The enlarged letters emphasize that the person cannot procrastinate but must start to diet immediately.

The frame 38 illustrates a cookie with a super-imposed "X" fixation point 21. Next, the frame 40 illustrates an ice cream cone with the word "STOP" super-imposed thereon. Finally, the frame 42 shows the word "SHORTER LIFE."

The messages and food items are sequentially projected onto the screen 14 in such a manner that the person being treated tends to build up an aversion to certain foods because they will result in shorter life. To avoid this unpleasant result, the person will naturally think of the good effects of a proper diet, which means longer life.

The projected images on the screen 14 are directed towards the visual senses of the person being treated. However, for maximum results in a minimum amount of treatment time, the present invention stimulates additional senses of the person being treated. The stimulation of one or more senses preferably are done simultaneously with the projections of the images on the screen 14.

Additional apparatus for producing signals to stimulate additional senses of the person 16 include a tape recorder 44, a tone generator unit 46 and an electrical shock inducer unit 48.

The tape recorder 44 may include a hypnotic induction tape for transmitting a message through a line 50 to a pair of earphones worn by the person being treated. Only one earphone 52 is illustrated. The message transmitted to the person from the tape of the tape recorder may cause the person to go into a hypnotic or semi-hypnotic state at the same time that he is viewing the images on the screen 14. The hypnosis treatment by a recording may be implemented by the psychologist or individual giving the treatment by speaking into a microphone 54, with the audio output from the microphone being transmitted to the earphones worn by the person being treated.

The tone generator 46 produces an audio signal which is transmitted to the earphones 52. This may be a continuous audio signal, variable from 100 to several thousand cycles. The signal may be modulated or unmodulated. The audio signal may be selectively applied at different times during the treatment. The tone generated may be manually controlled by a remote control switch unit 47. This unit 47 is selectively operated by the individual giving the treatment.

The shock inducing unit 48 is used to selectively apply electrical shock signals through a line 55 to a pair of electrodes 56 worn by the person being treated. A remote control unit 58, which may be manually operated by the individual giving the treatment to close a circuit to produce shock signals. The electrical signals involve relatively low voltages, generally variable under 10 volts. The amplitudes are not high enough to injure the person being treated. At the same time, they are high enough to cause discomfort and unpleasantness.

It is understood that electrical lines illustrated include return leads to provide complete circuits and returns to a common reference point or ground.

It is seen that utilizing the apparatus of the present invention, a person may be treated by simultaneously effecting a number of his senses. The projectors 10 and 12 along with the screen 14 stimulate the visual senses. At the same time, the tape recorder 44 and the microphone 54 provide means for transmitting messages which may be received by the subconscious mind of the person being treated. The selective application of a tone from the tone generator 46 is communicated to the aural senses of the person being treated. The shock signals from the source 48 are communicated to the sense of feeling of the person being treated. The composite effect of signals applied to a number of different senses from a plurality of sources makes it possible to assist persons in building up aversions to undesirable habits more effectively and in a shorter period of treatment time.

While the habit of over-eating has been described in connection with the present invention, it is apparent that the invention is applicable to a wide variety of different habits, such as smoking, taking drugs and other habits which tend to adversely affect a person's physical, mental and emotional well being. The projected images on the slides, the messages on the tape recorder, the frequency and selection of the use of tones and shock treatments may all be varied in accordance with the habit towards which an aversion is to be built up.

What is claimed is:

1. Apparatus for clinically treating a person to assist him in averting a habit comprising means for displaying images projected thereon, first means for projecting a first stationary image on said means for displaying to provide a relatively small fixation area, second means for projecting a second stationary image superimposed over said first image on said means for displaying, said second image being associated with an object or message relating to said habit, a source of signals capable of affecting the senses of said person, means for selectively operating said source of signals independently of the operations of said first and second means for projecting, and means for selectively coupling said signals to the senses of said person being treated simultaneously with the projections of said first and second images.

2. Apparatus as set forth in claim 1, wherein said source of signals capable of affecting the senses of said person comprises a recorder for generating an audible message to said person, said message being capable of inducing a hypnotic state in said person.

3. Apparatus as set forth in claim 2, wherein said source of signals capable of affecting the senses of said person further comprises a microphone to permit an individual administering treatment to communicate with said person.

4. Apparatus as set forth in claim 1, wherein said source of signals capable of affecting the senses of said person comprises means for selectively generating and transmitting electrical shock signals to said person.

5. Apparatus as set forth in claim 1, wherein said source of signals capable of affecting the senses of said person comprises means for generating and transmitting tone signals to said person.

6. Apparatus as set forth in claim 2, wherein said source of signals capable of affecting the senses of said person further comprises means for selectively generating and transmitting electrical shock signals to said person.

7. Apparatus as set forth in claim 2, wherein said source of signals capable of affecting the senses of said person further comprises means for generating and transmitting tone signals to said person.

8. Apparatus as set forth in claim 6, wherein said source of signals capable of affecting the senses of said person further comprises means for generating and transmitting tone signals to said person.

9. Apparatus as set forth in claim 1, wherein said second means for projecting comprises a slide including a plurality of frames thereon depicting pictures and messages relating to said habit, said frames being sequentially displayed on said means for display.

10. Apparatus as set forth in claim 9, wherein said first means for projecting includes means for continuously displaying said small fixation area when said plurality of frames is sequentially displayed.

* * * * *